United States Patent
Jung et al.

(10) Patent No.: US 10,609,752 B2
(45) Date of Patent: Mar. 31, 2020

(54) METHOD OF REESTABLISHING RADIO LINK AND WIRELESS COMMUNICATION DEVICE USING THE METHOD

(71) Applicant: ELECTRONICS AND TELECOMMUNICATIONS RESEARCH INSTITUTE, Daejeon (KR)

(72) Inventors: Soo Jung Jung, Daejeon (KR); Seung Kwon Baek, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/232,361

(22) Filed: Dec. 26, 2018

(65) Prior Publication Data

US 2019/0327783 A1 Oct. 24, 2019

(30) Foreign Application Priority Data

Apr. 20, 2018 (KR) .................. 10-2018-0046261

(51) Int. Cl.
*H04W 76/19* (2018.01)
*H04B 7/08* (2006.01)
(Continued)

(52) U.S. Cl.
CPC ............ *H04W 76/19* (2018.02); *H04B 7/088* (2013.01); *H04W 16/28* (2013.01); *H04W 24/10* (2013.01); *H04W 72/042* (2013.01)

(58) Field of Classification Search
CPC ... H04W 24/10; H04W 16/28; H04W 72/042; H04W 76/19; H04W 72/085; H04W 76/38; H04B 7/0617; H04B 7/0695; H04B 7/088
(Continued)

(56) References Cited

U.S. PATENT DOCUMENTS

2015/0373627 A1 12/2015 Ryu et al.
2015/0382268 A1 12/2015 Hampel et al.
(Continued)

FOREIGN PATENT DOCUMENTS

| KR | 10-2018-0007653 A | 1/2018 |
|---|---|---|
| WO | 2018/013596 A1 | 1/2018 |
| WO | WO-2018082715 A1 * | 5/2018 |

OTHER PUBLICATIONS

Marco Giordani et al., "Comparative Analysis of Initial Access Techniques in 5G mmWave Cellular Networks", 2016 Annual Conference on Information Science and Systems (CISS).

*Primary Examiner* — Leila Malek
(74) *Attorney, Agent, or Firm* — LRK Patent Law Firm

(57) ABSTRACT

A method of reestablishing a radio link which is performed by a wireless communication device that communicates with a peer node includes monitoring quality of a radio link used for communication with the peer node, determining whether radio link reestablishment is needed when the quality of the radio link is less than or equal to a reference value, determining a beam search parameter using at least one of information on the activation status of the radio link and mobility information of the peer node, performing a beam search necessary for radio link reestablishment according to the beam search parameter, and reestablishing a radio link with the peer node using a found beam.

18 Claims, 8 Drawing Sheets

(51) Int. Cl.
  *H04W 16/28* (2009.01)
  *H04W 24/10* (2009.01)
  *H04W 72/04* (2009.01)

(58) Field of Classification Search
  USPC .......................................................... 375/267
  See application file for complete search history.

(56) References Cited

U.S. PATENT DOCUMENTS

| | | |
|---|---|---|
| 2016/0021548 A1 | 1/2016 | Raghavan et al. |
| 2016/0036510 A1* | 2/2016 | Hosoya ................ H04B 7/0617 |
| | | 375/267 |
| 2016/0183234 A1 | 6/2016 | Sung et al. |
| 2016/0192358 A1 | 6/2016 | Lee et al. |
| 2017/0374703 A1 | 12/2017 | Sang et al. |
| 2019/0037530 A1* | 1/2019 | Han ..................... H04B 7/0617 |
| 2019/0261202 A1* | 8/2019 | Tang .................... H04B 7/0617 |

* cited by examiner

EXHAUSTIVE SEARCH

HIERARCHICAL SEARCH

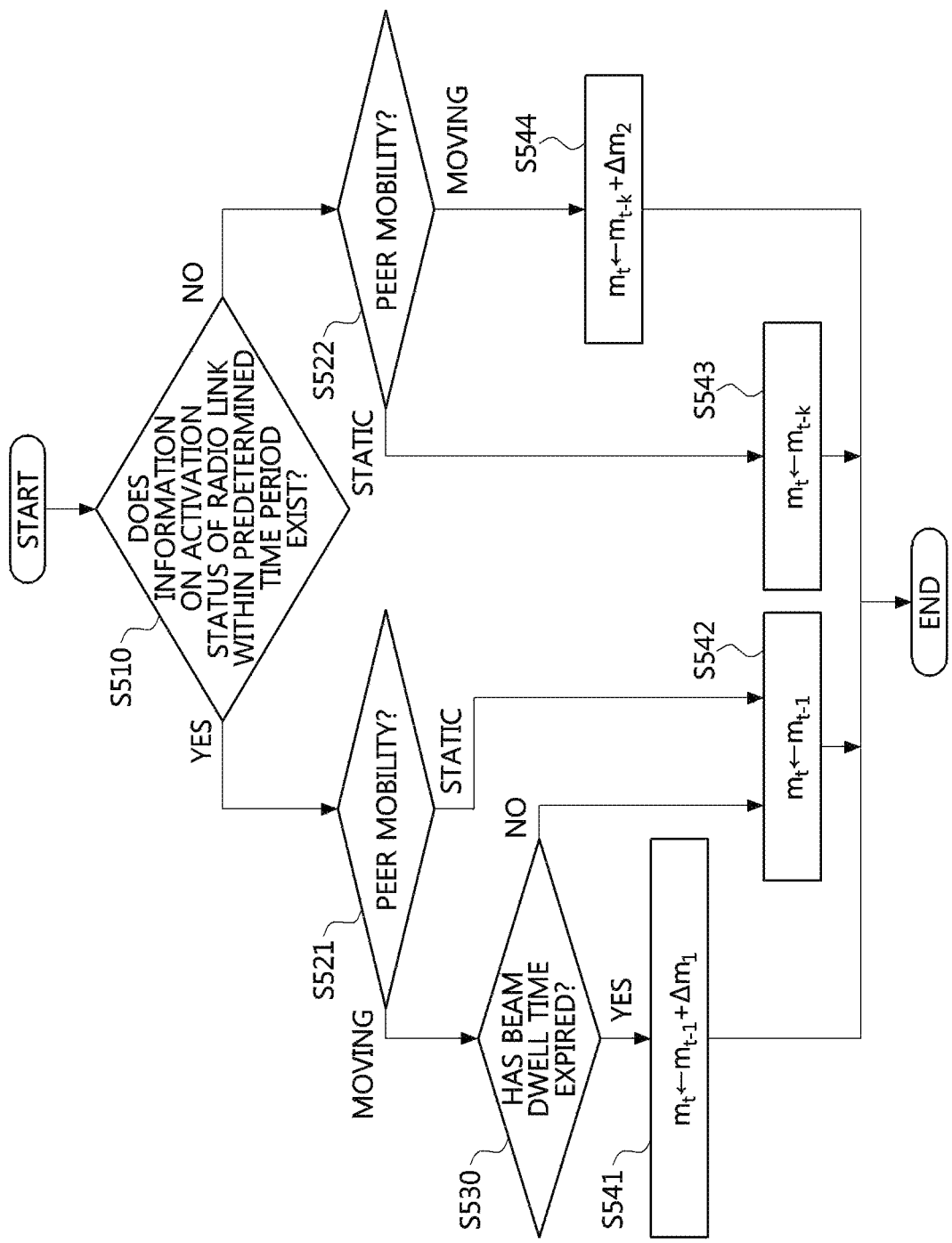

STARTING BEAM

METHOD OF REESTABLISHING RADIO LINK AND WIRELESS COMMUNICATION DEVICE USING THE METHOD

CROSS-REFERENCE TO RELATED APPLICATION

This application claims priority to and the benefit of Korean Patent Application No. 10-2018-0046261, filed Apr. 20, 2018, the disclosure of which is incorporated herein by reference in its entirety.

BACKGROUND

1. Field of the Invention

The present invention relates to a method of reestablishing a radio link and a wireless communication device using the method, and more specifically, to a method of reestablishing a radio link in a wireless communication network using directional communication and a wireless communication device using the method.

2. Discussion of Related Art

In order to accommodate surging data traffic in next-generation mobile communication networks after long term evolution (LTE)/LTE-advanced (LTE-A), the use of a millimeter-wave band (30-300 GHz), which allows allocation of a wider frequency band, is considered. In the case of a millimeter-wave band, as compared to a microwave band (sub-6 GHz) of LTE/LTE-A, there is a characteristic of large path loss, and, accordingly, in order to reduce the large path loss in the millimeter-wave band, directional communication through beamforming and multi-antenna beamforming technologies is being considered so that existing cell coverage can be guaranteed.

A transmission node is connected in a network and performs directional communication with another transmission node. This means that transmission and reception are performed in one specific selected direction between the two transmission nodes, which means that the transmission beam and reception beam in a specific direction are used. Therefore, in the case of a radio link established between transmission nodes in a network using millimeter waves, sudden loss of radio link may occur due to blockage or the like, unlike an existing radio link.

In order to reestablish a radio link when loss of radio link occurs as described above, a procedure for determining each beam direction for transmission and reception between two transmission nodes is further required, unlike a procedure for reestablishing a radio link which uses an existing microwave band (<6 GHz). To this end, a beam search procedure must be performed.

SUMMARY OF THE INVENTION

In order to solve the above-described problems, one objective of the present invention is to provide a method of reestablishing a radio link which allows a delay needed for the total radio link reestablishment procedure to be reduced by reducing a delay needed for beam acquisition through a beam search procedure.

To solve the above-described problems, another objective of the present invention is to provide a wireless communication device which uses the method of reestablishing a radio link.

In one general aspect, there is provided a method of reestablishing a radio link which is performed by a wireless communication device that communicates with a peer node, the method including monitoring quality of a radio link used for communication with the peer node, determining whether radio link reestablishment is needed when the quality of the radio link is less than or equal to a reference value, determining a beam search parameter using at least one of information on the activation status of the radio link and mobility information of the peer node, performing a beam search necessary for radio link reestablishment according to the beam search parameter, and reestablishing a radio link with the peer node using a found beam.

The beam search parameter may include at least one of a direction of a beam from which to start a search, a step size of a search, and a search proceeding direction.

The direction of the beam from which to start a search may be an index of a beam from which a search starts among all beams of the wireless communication device. The direction of the beam from which to start a search may be determined using at least one of the information on the activation status of the radio link, the mobility of the peer node, and a beam dwell time.

The information on the activation status of the radio link may include a direction of the last beam in which the radio link was kept in an active state.

The mobility of the peer node may include a moving velocity and moving direction of the peer node with respect to the wireless communication device.

The performing of the beam search necessary for radio link reestablishment according to the beam search parameter may include receiving a plurality of reference signals transmitted by the peer node that is a master node and determining a receive beam corresponding to the reference signal.

The performing of the beam search necessary for radio link reestablishment according to the beam search parameter may include receiving reference signals transmitted by a plurality of peer nodes, determining a master node among the plurality of peer nodes according to the reference signal, and determining a receive beam corresponding to a reference signal transmitted by the determined master node.

The determining of the beam search parameter using at least one of the information on the activation status of the radio link and the mobility information of the peer node may include determining a fixed step size and maintaining the search direction to one direction when the moving direction of the peer node is fixed.

The determining of the beam search parameter using at least one of the information on the activation status of the radio link and the mobility information of the peer node may include setting the step size in units of sub-groups and performing the beam search by selecting one beam for each sub-group.

The determining of the beam search parameter using at least one of the information on the activation status of the radio link and the mobility information of the peer node may include, when accuracy of the direction of the beam from which to start a search is high, setting the search proceeding direction by changing the search proceeding direction in every search step.

In another general aspect, there is provided a wireless communication device which reestablishes a radio link used for communication with a peer node, the wireless communication device including a processor and a memory in which at least one command to be executed by the processor is stored.

The at least one command may include a command to monitor quality of the radio link used for communication with the peer node, a command to determine whether radio link reestablishment is required when the quality of the radio link is less than or equal to a reference value, a command to determine a beam search parameter using at least one of information on the activation status of the radio link and mobility information of the peer node, a command to perform a beam search necessary for radio link reestablishment according to the beam search parameter, and a command to reestablish a radio link with the peer node using the found beam.

The beam search parameter may include at least one of a direction of a beam from which to start a search, a step size of a search, and a search proceeding direction.

The direction of a beam from which to start a search may be an index of a beam from which search starts among all beams of the wireless communication node.

In addition, the direction of the beam from which to start a search may be determined using at least one of the information on the activation status of the radio link, the mobility of the peer node, and a beam dwell time.

The information on the activation status of the radio link may include a direction of the last beam in which the radio link was kept in an active state.

The mobility of the peer node may include a moving velocity and moving direction of the peer node with respect to the wireless communication device.

The wireless communication device may be a terminal or a base station.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 5 is an operation flowchart of a method of determining a direction of a starting beam according to one embodiment of the present invention;

DETAILED DESCRIPTION OF EXEMPLARY EMBODIMENTS

Figure 1:
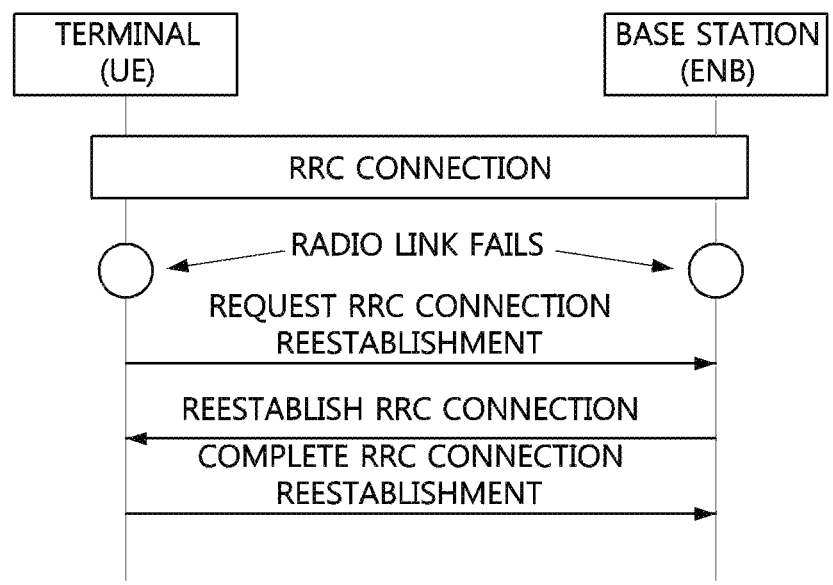
FIG. 1 is a diagram illustrating a link reestablishment procedure in a mobile communication network to which the present invention is applicable.

Example embodiments of the present invention are disclosed herein. However, specific structural and functional details disclosed herein are merely representative for purposes of describing the example embodiments of the present invention, and the example embodiments of the present invention may be embodied in many alternate forms and should not be construed as limited to the example embodiments of the present invention set forth herein.

Accordingly, while the present invention is susceptible to various modifications and alternative forms, specific embodiments thereof are shown by way of example in the drawings and will herein be described in detail. It should be understood, however, that there is no intent to limit the present invention to the particular forms disclosed, but on the contrary, the present invention is to cover all modifications, equivalents, and alternatives falling within the spirit and scope of the present invention. Like numbers refer to like elements throughout the description of the figures.

It will be understood that, although the terms first, second, etc. may be used herein to describe various elements, the elements should not be limited by the terms. The terms are only used to distinguish one element from another. For example, a first element could be termed a second element, and, similarly, a second element could be termed a first element without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the present specification, a terminal may refer to a mobile terminal (MT), a mobile station (MS), an advance mobile station (AMS), a high reliability mobile station (HR-MS), a subscriber station (SS), a portable subscriber station (PSS), an access terminal (AT), user equipment (UE), and the like, and may include functions of some or all of MT, MS, AMS, HR-MS, SS, PSS, AT, UE, and the like.

In addition, a base station (BS) may refer to an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as a BS, a relay node (RN) serving as a BS, an advanced relay station (ARS) serving as BS, a high reliability relay station (HR-RS) serving as a BS, a small base station, such as a femto BS, a home node B (HNB), a home eNodeB (HeNB), a pico BS, a metro BS, and a micro BS, and the like, and may include functions of some or all of ABS, NodeB, eNodeB, AP, RAS, BTS, MMR-BS, RS, RN, ARS, HR-RS, small base station, and the like. In addition, the BS may refer to a BS of a macro cell, a remote radio head (RRH) cell, a pico cell, a micro cell, a femto cell, or the like, according to a shape of a cell.

Hereinafter, exemplary embodiments of the present invention will be described in detail with reference to the accompanying drawings.

FIG. 1 is a diagram illustrating a link reestablishment procedure in a mobile communication network to which the present invention is applicable.

When a wireless communication network is a mobile communication network, a transmission node may include a base station (eNB), a terminal (UE), a relay station, and the like in the mobile communication network. FIG. 1 illustrates a case in which transmission nodes for transmission and reception are a base station and a terminal.

A radio resource control (RRC) connection reestablishment procedure is performed in a long term evolution (LTE)/LTE-advanced (LTE-A) system when a radio link failure, a handover failure, or an RRC connection reconfiguration failure occurs in a state in which the terminal is being connected to the network. FIG. 1 shows a situation in which a failure occurs in a radio link. Referring to FIG. 1, when a radio link failure occurs in a state in which the base station and the terminal are RRC-connected, the terminal sends a request for RRC connection reestablishment to the base station, then the base station performs RRC connection reestablishment, the RRC reestablishment procedure is completed.

Meanwhile, in a wireless network utilizing a millimeter-wave (mmWave) band, beam acquisition is performed by performing a beam search procedure to determine a beam-forming direction of directional transmission and reception between transmission nodes. An exhaustive search method and a hierarchical search method may be used for the beam search procedure.

Figure 2A:
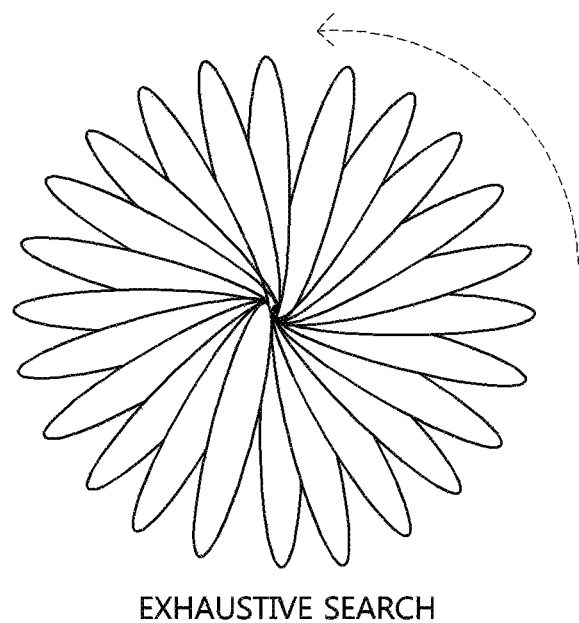
FIG. 2A is a conceptual diagram illustrating a beam search method according to an exhaustive search method.

FIG. 2A is a conceptual diagram illustrating a beam search method according to an exhaustive search method.

Referring to FIG. 2A, in the case of the exhaustive search method, beam search is sequentially performed for all directions in the vicinity using a fixed beamwidth, and a transmit (tx) beam sweeping procedure for transmission beam determination and a receive (rx) beam sweeping procedure for reception beam determination are performed separately. Accordingly, the time required to complete the beam search procedure in accordance with the exhaustive search method is proportional to the product of the number M of tx beams and the number N of rx beams.

Figure 2B:
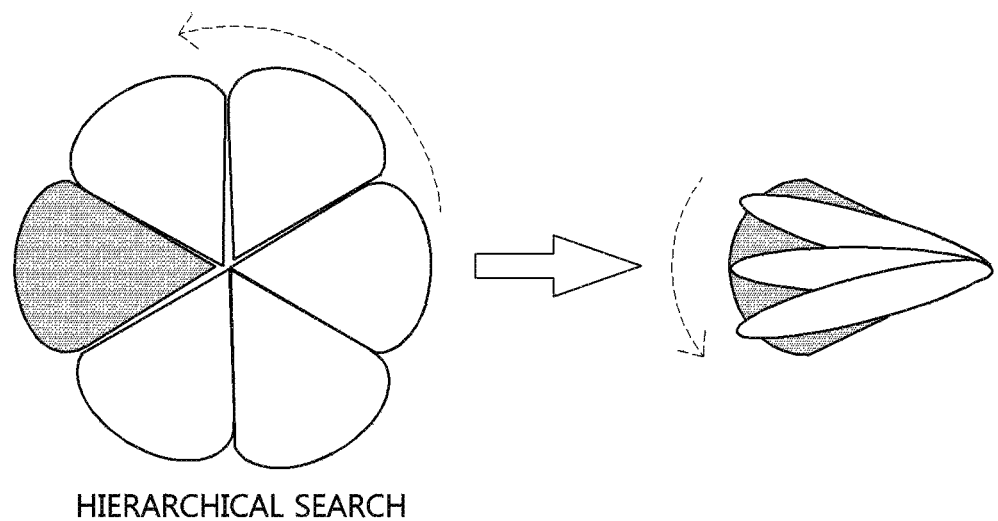
FIG. 2B is a conceptual diagram illustrating a beam search method according to a hierarchical search method.

FIG. 2B is a conceptual diagram illustrating a beam search method according to a hierarchical search method.

Referring to FIG. 2B, the hierarchical search method schematically performs a beam sweep for all directions with a beam having a wide beamwidth, and then performs a finer search in a beam direction by narrowing the beamwidth only for a selected direction. When a two-stage method is applied, the time required to complete the beam search procedure, assuming the total number of beams having wide beamwidths (Mw for the tx beams and Nw for rx beams) in the first stage and the number of beams having narrow beamwidths (Mn for the tx beams and Nn for the rx beams) in the second stage, is proportional to the sum of the product of the numbers of tx beams and rx beams having the wide beamwidths and the product of the numbers of tx beams and rx beams having the narrow beamwidths. In this method, a finer beam direction of the next stage is searched in the beam direction selected in the previous stage so that the accuracy in an initial stage determines the overall performance. Therefore, when the narrow beamwidth is configured to be equal to the beamwidth in the exhaustive search method (M=MwMn and N=NwNn), the hierarchical search method may reduce the execution time of the beam search compared to the exhaustive search method.

Figure 3:
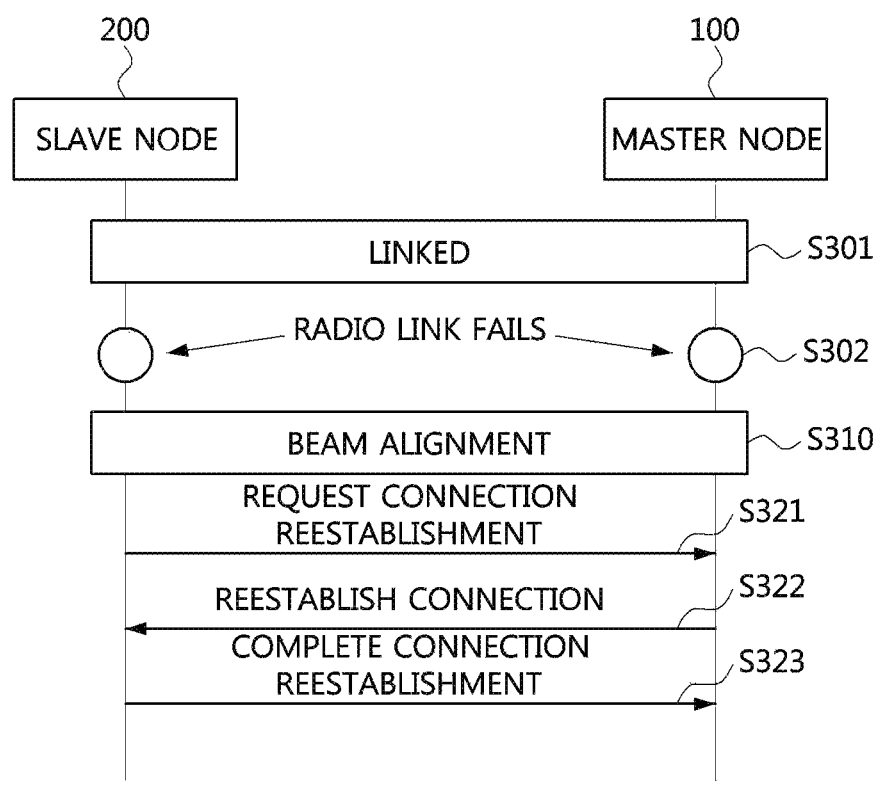
FIG. 3 is an operation flowchart of a method of reestablishing a radio link according to one embodiment of the present invention.

FIG. 3 is an operation flowchart of a method of reestablishing a radio link according to one embodiment of the present invention.

Referring to FIG. 3, the present invention relates to radio link reestablishment which is performed between two nodes, i.e., a master node 100 and a slave node 200, located in a wireless network.

A radio link utilizing a millimeter-wave band according to the present invention is established between two transmission nodes, wherein one transmission node that manages a established radio link and controls a peer transmission node acts as a master, and the transmission node that receives resource allocation and is controlled through the master transmission node acts as a slave. That is, in the operation of the radio link established between the two transmission nodes, the master may serve as a base station of a mobile communication network, such as an existing LTE/LTE-A, and the slave may correspond to a terminal.

The present invention proposes a method of quickly reestablishing a radio link when the radio link established between transmission nodes constituting a wireless communication network that utilizes millimeter waves is difficult to maintain due to mobility of the transmission nodes and blockage.

The present invention proposes a method of reducing a delay in link reestablishment by determining an initial direction on the basis of information acquired during operation of a previously established radio link and quickly determining a beam direction using the initial direction, rather than reestablishing a radio link by determining a direction after searching in all possible directions.

Referring to FIG. 3, in a state in which a radio link is established between the master node 100 and the slave node 200 (S301), when radio link loss occurs (S302), a radio link reestablishment procedure is considered (S310), or in a state in which a radio link has been established between the two transmission nodes but is in an inactive state in which transmission and reception of actual traffic is disabled, when the inactive state needs to be switched to an active state due to generation of data to be transmitted and synchronization acquisition for the transmission and reception is required, the radio link reestablishment procedure is considered (S310). In this case, the slave node 200 monitors quality of the radio link through a reference signal (RS) periodically transmitted from the master node 100. When the quality of the radio link falls below a threshold value, the slave node 200 determines the reestablishment of the radio link in operation in consideration of occurrence of a relevant event.

When the reestablishment of a radio link is determined due to the radio link loss, a beam acquisition procedure for directional communication between the two transmission nodes through a millimeter-wave band is performed. Referring to FIG. 3, the beam acquisition is performed through the beam search operation S310.

In this case, the beam search procedure S310 may include operations of determining a beam search parameter using at least one of information on the activation status of the radio link and mobility information of the peer node and searching for a beam required for radio link reestablishment according to the beam search parameter.

In this case, the beam search parameter may include at least one of a direction of a beam from which to start a search, a search step size, and a search proceeding direction. The direction of a beam from which to start a search may be an index of a beam from which search starts among all the beams of the wireless communication node. In addition, the direction of a beam from which to start a search may be determined using the information on the activation status of the radio link, the mobility of the peer node, and a beam dwell time. The information on the activation status of the radio link may include a direction of the last beam in which the radio link was kept in an active state.

Meanwhile, the mobility of the peer node may include a moving velocity and a moving direction of the peer node with respect to a wireless communication device. In addition, the beam search may be performed according to the exhaustive search method or the hierarchical search method.

When the moving direction of the peer node, for example, is fixed, the beam search parameter may be determined by the step size being determined to be a fixed size and the search direction being maintained in one direction. In addition, the step size may be set in units of sub-groups, one beam may be selected for each sub-group, and the beam search may be performed. Also, when the direction of the beam from which to start a search is highly accurate, the search proceeding direction may be changed in every search step.

When the beam acquisition is completed through the beam search procedure S310, the slave node 200 requests the master node 100 to reestablish an RRC connection (S321) and then the master node 100 performs RRC connection reestablishment to the slave node 200 (S322), the RRC reestablishment procedure is completed (S323).

Figure 4:
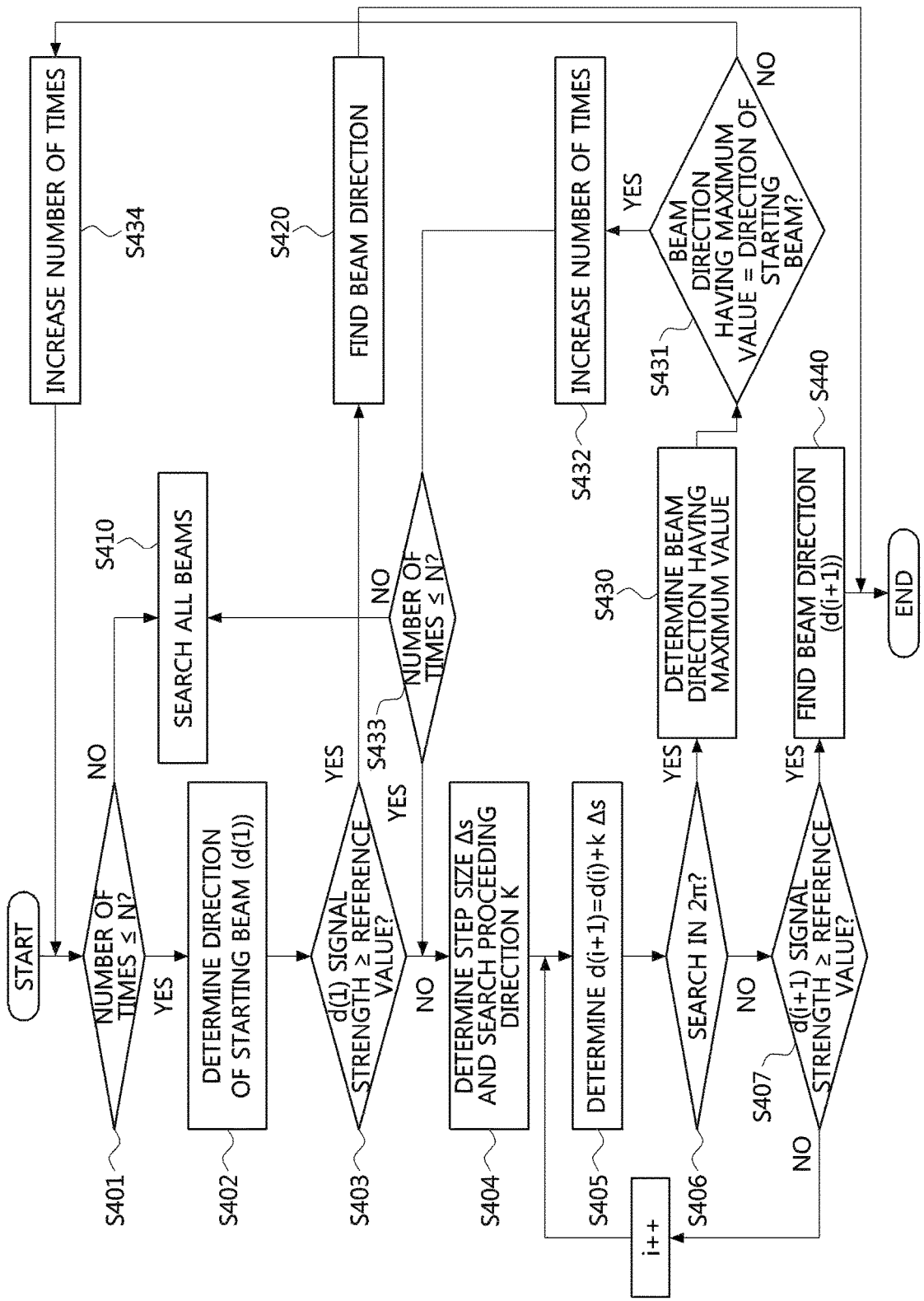
FIG. 4 is an operation flowchart of a method of searching for a beam according to one embodiment of the present invention.

FIG. 4 is an operation flowchart of a method of searching for a beam according to one embodiment of the present invention.

The method of searching for a beam shown in FIG. 4 may be performed by each transmission node in accordance with the present invention, and a beam to be used is acquired as a result of beam search. Here, the transmission node, which is a wireless communication device located in a wireless network, may be a base station or a terminal.

Referring to FIG. 4, the number of searches is set as a variable for beam search, and whether the number of searches reaches n, which is a preset total number of searches, is checked (S401). When the number of searches accumulated until the current stage is less than or equal to n, a direction of a starting beam for beam search is determined (S402). Here, the direction of a starting beam from which a search starts may be determined on the basis of information previously acquired during operation of a radio link established between two transmission nodes.

When a signal strength in the direction of a starting beam is greater than or equal to a reference value (S403—YES), the direction of the beam is determined as a beam direction for radio link reestablishment (S420), and the beam search procedure is terminated. On the contrary, when the signal strength in the direction of a starting beam is less than the reference value (S403—NO), a direction k and a step size $\Delta_s$ in which the subsequent search is to be proceeded from the determined starting beam are determined (S404). The transmission node newly determines a beam direction, i.e., a beam index d(i+1) using the direction of a starting beam, the search direction, and the step size (S405), and determines whether the search in all beam directions (i.e., $2\pi$) on the basis of the direction of a starting beam is completed (S406).

When the beam search on the basis of the direction of a starting beam is not completed (S406—NO), it is determined whether a signal strength in the newly determined beam direction d(i+1) is greater than or equal to the reference value (S407). When it is determined that a signal having an strength greater than or equal to the reference value is detected in the corresponding beam direction, the corresponding beam direction is determined to be a beam direction for radio link reestablishment (S440), and the beam search procedure is terminated. Operations S405 to S407 are repeated until a beam direction in which the signal strength is greater than or equal to the reference value is found.

When the search in all directions on the basis of the direction of a starting beam is completed ($2\pi$ search) (S406—YES), a direction in which the largest signal strength is present is checked among the searched beam directions (S430). When the confirmed direction having the maximum signal strength is the same as the direction of a starting beam (S431—YES), the number of searches is increased (S432), and operations S401 to S432 are repeatedly performed by performing adjustment of step size. That is, the step size is adjusted to a smaller value to perform a more accurate beam search in a corresponding area.

When the direction having the maximum signal strength is different from the existing direction of a starting beam (S432—NO), the number of searches is increased (S434), the beam direction of the maximum signal strength is changed as a new direction of a starting beam, and operation S404 to S432 are repeatedly performed by determining the direction and step size on the basis of the new direction of a starting beam.

In this case, the step size may be newly determined or the existing step size may be re-used. The above-described procedures are performed only when the number of repetitions is within a predetermined value. In addition, the number of repetitions is determined in consideration of the number of all beam directions and the step size. Here, when the beam search is performed similarly to a hierarchical search method according to the setting of a step size, the number of repetitions may be the same as the number of beam directions that form a hierarchy. That is, when the step size $\Delta_s$ is 2, the number of repetitions may be set to 2. In the case in which the direction of a starting beam is changed with a fixed step size, when the search is repeated for the set number of repetitions, it may be possible to complete searching in all directions. According to another embodiment of the present invention, a finer search in the vicinity of the direction of a starting beam may be made by altering the step size while maintaining the direction of a starting beam.

When the search is repeated in excess of the set number of repetitions, a beam direction is determined by applying an exhaustive search method and sequentially searching in all directions (S410). The search direction is determined in consideration of accuracy of the determined direction of a beam from which to start a search, the moving direction, and the like. That is, in case in which a radio link reestablishment procedure is performed before a beam dwell time has elapsed since radio link loss or the like occurs in an active state, the accuracy of the direction of a starting beam is considered to be high, and the search direction may be changed in every search step such that nearby beams can be searched first. Meanwhile, in a case in which the radio link is inactive and in a case in which the moving direction is fixed, the search direction may be set to a constant direction.

FIG. 5 is an operation flowchart of a method of determining a direction of a starting beam according to one embodiment of the present invention.

A direction of a beam from which to start beam search (i.e., a direction of a starting beam) according to one embodiment of the present invention may be determined on the basis of information acquired during operation of a radio link established between two transmission nodes.

Here, the information acquired during operation of a radio link may include information on the activation status of the radio link, mobility information of the transmission node, and beam direction information of each transmission node for the existing radio link. In addition, the mobility information of a transmission node may include information on the speed and moving direction of the node. When a direction of a starting beam is determined through procedures shown in FIG. 5, it is possible to reduce the number of beam directions to be searched until a beam direction having a signal strength greater than or equal to a reference value is found.

Referring to FIG. 5, the transmission node first checks information on the activation status of a radio link (S510). That is, the transmission node checks whether transmission and reception of traffic through the established radio link occurred within a predetermined period of time in the past. The information on the activation status of radio link is used to determine accuracy of previous beam index $m_{t-1}$ or outdated previous beam index $m_{t-j}$ of the transmission node. When the information on activation status of the radio link which occurred within a certain previous period of time is present, an immediately preceding beam direction, that is, beam index $m_{t-1}$, becomes a reference for determining a direction of a starting beam, and when information on activation status of the radio link which occurred for a period in excess of a predetermined time is present, the outdated previous beam index $m_{t-j}$ becomes a reference for determining a direction of a starting beam.

Then, the corresponding node checks mobility information of a peer node (S521 and S522). The procedure for checking mobility information of a peer node is performed individually for each case where the radio link activation status information is present within a predetermined time period (S521) and where the radio link activation status information is not present (S522).

When the mobility of a peer node (peer mobility) is present (in the case of moving), it is possible to adjust the determined reference beam direction, $m_{t-1}$ or $m_{t-j}$. That is, the mobility information of a peer node is used to determine whether to adjust ($\Delta m_1$ or $\Delta m_2$) the reference beam direction.

Here, the mobility information of a peer transmission node may include relative mobility information. In other words, when a corresponding transmission node is of a fixed type and a peer transmission node moves, a moving velocity and direction of the peer transmission node are used, intact, as the mobility information. In addition, when a corresponding transmission node is of a moving type and a peer transmission node is of a fixed type, the mobility information of the peer transmission node is determined on the basis of the corresponding transmission node. When both of the two transmission nodes are of a moving type, relative mobility information with respect to each other may be utilized.

When a fixed beamwidth is used, an adjustment value $\Delta m_1$ for a beam direction may be determined in consideration of a beam dwell time $t_d$ and mobility (S530). That is, when the peer node has mobility and the beam dwell time has expired, adjustment for the reference beam direction $m_{t-1}$ may be performed (S541).

For example, after the previous beam direction $m_{t-1}$ is obtained, a value obtained by dividing a moving time interval by a beam dwell time is acquired as information on a changed beam direction, and the acquired information may be determined as an adjustment value $\Delta m_1$ of the direction of a starting beam. Such adjustment is performed when the radio link is reestablished in an active state, and in this case, the information on previous beam direction $m_{t-1}$ is maximally utilized.

In addition, the adjustment value may be determined to be $\Delta m_2 = \Delta m_1 + a$ (S544). The adjustment value $\Delta m_t$ is obtained in consideration of a change $\alpha$ in directivity in a state in which a radio link is inactive and the mobility (S522—MOVING) when the previous beam direction $m_{t-j}$ with low accuracy is determined to be a reference direction of a starting beam (S510—NO).

Meanwhile, when there is no mobility of a peer node, the intact beam index $m_{t-1}$ or $m_{t-j}$, in which the radio link activation status information on a previous time interval is present, is determined to be the direction of a starting beam (S542 and S543).

When the direction of a starting beam, the step size, and the search proceeding direction for a beam search of the transmission node for reestablishing a radio link are determined through the above-described procedures, the beam search procedure according to the present invention may be performed, and various embodiments thereof will be described below with reference to FIGS. 6A to 6C.

Figure 6A:
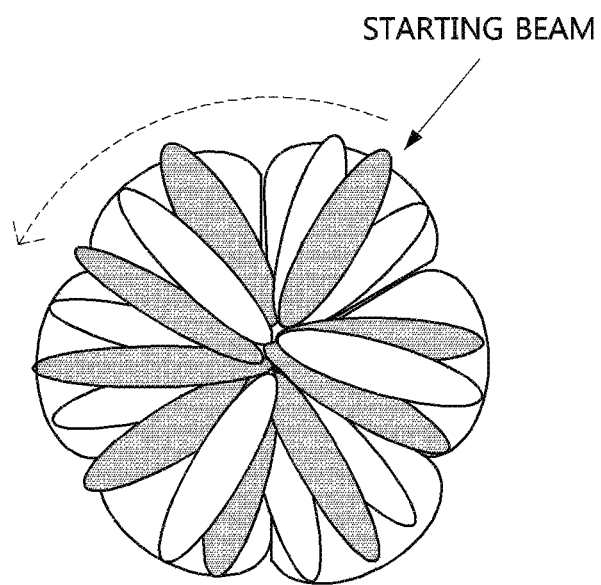
FIGS. 6A to 6C are diagrams illustrating embodiments of a method of searching for a beam according to the present invention.
Figure 6B:
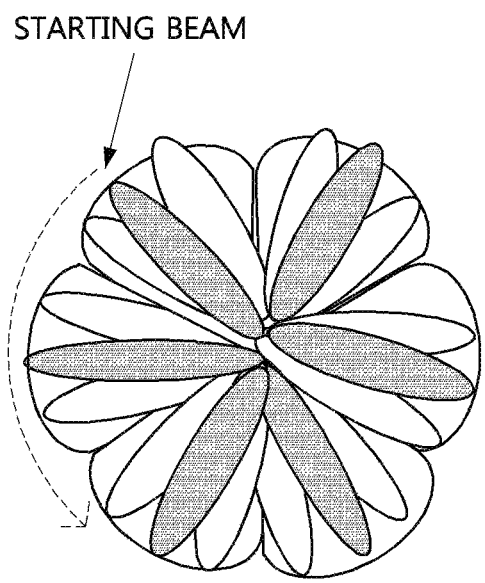
Figure 6C:
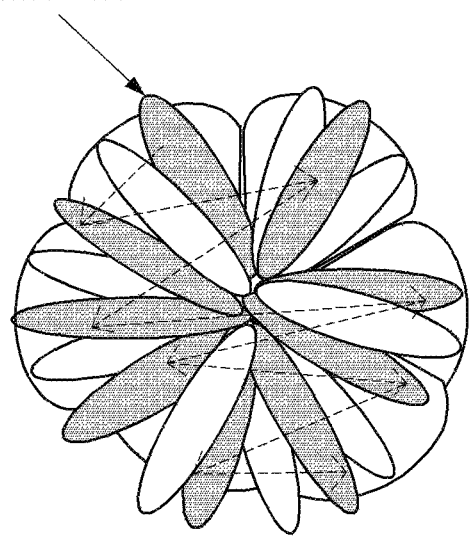

FIGS. 6A to 6C are diagrams illustrating embodiments of a method of searching for a beam according to the present invention.

The beam search method of FIG. 6A is an embodiment in which a beam search is performed with a fixed step size $\Delta_s$ in a constant direction after a beam direction from which a beam search starts is determined. In this case, the step size may be determined in units of beams having a fixed beamwidth. In the embodiment shown in FIG. 6A, the step size $\Delta_s$ is 2. In this case, a beam search direction may be $d(i+1)=d(i)+(+/-)\Delta_s=d(1)+(+/-)(i)\Delta_s$, and $d(1)=d(0)+\Delta m_1$ (or $\Delta m_2$) and $d(0)=m_{t-1}$ or $d(0)=m_{t-j}$ and $k=+1/-1$. The present embodiment may be applied to a case where an analysis result of obtained mobility information indicates that a moving direction is fixed.

The beam search method shown in FIG. 6B corresponds to an example in which the step size in the embodiment of FIG. 6A is set in units of sub-groups (e.g., sectors). That is, one beam is selected for each sub-group and a search is performed in the selected beam direction. This method uses beams having a fixed beamwidth without altering the beamwidth and allows operations to be performed similarly to a hierarchical beam search method.

The beam search method shown in FIG. 6C changes a search direction in every search step, unlike the beam search methods of FIGS. 6A and 6B in which a beam search is performed in a constant direction. That is, the present embodiment corresponds to a case in which it is determined that accuracy of a direction of a starting beam is high, and a beam search is performed around the direction of a starting beam after an initial beam direction from which the search starts is determined. In this case, the search direction is changed in consideration of a fixed step size $\Delta_s$. In the embodiment of FIG. 6C, the step size $\Delta_s$ is 2, and a search beam direction, i.e., beam index, may be defined as $d(i+1)=d(i)+(-1)^{i+1}(i)\Delta_s$, and a search proceeding direction k may be represented as $(-1)^{i+1}$.

Figure 7:
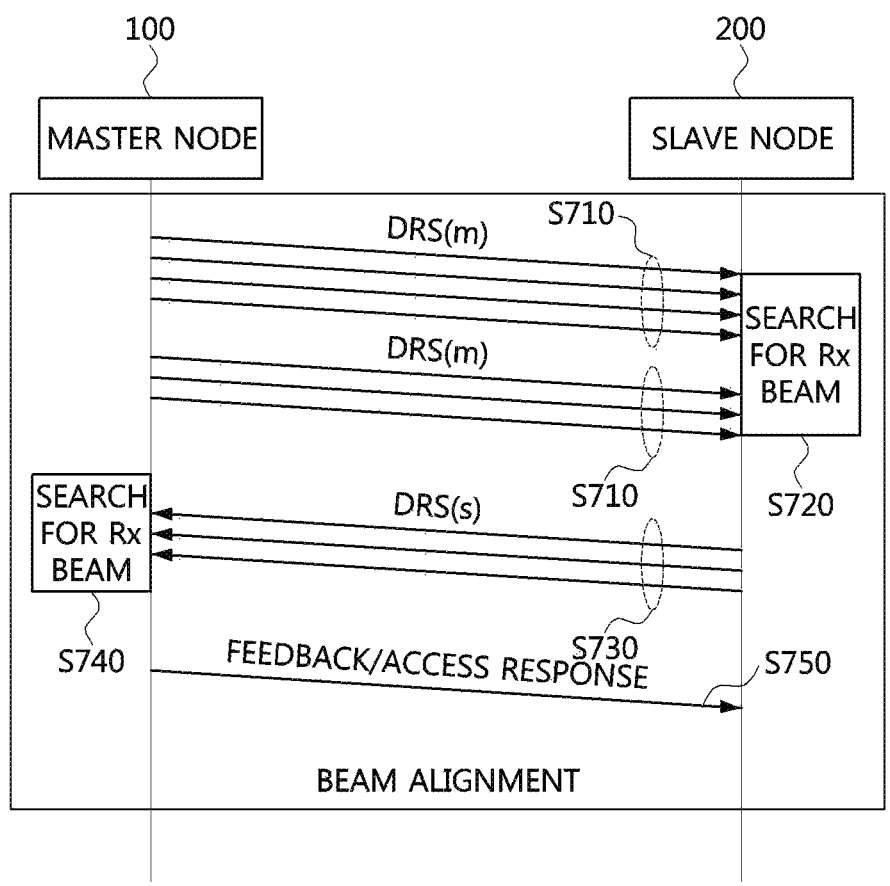
FIG. 7 is an operation flowchart of a beam search procedure for beam acquisition performed between transmission nodes according to one embodiment of the present invention.

FIG. 7 is an operation flowchart of a beam search procedure for beam acquisition performed between transmission nodes according to one embodiment of the present invention.

The beam search procedure shown in FIG. 7 is a detailed procedure when beam reciprocity exists. Having beam reciprocity means that a direction of an rx beam and a direction of a tx beam are the same, and therefore, an rx beam search procedure may be performed by two transmission nodes, a master node and a slave node.

A master node 100 serving as a base station sequentially transmits a periodic discovery reference signal (DRS) for beam search in all directions (S710). The DRS is transmitted not only for a node performing a radio link reestablishment procedure but also for a node initially accessing a network.

A slave node 200 performing a radio link reestablishment procedure determines a beam direction to receive among the directions of the discovery reference signals DRS(m) received from the master transmission node. In this case, the slave node determines a direction of an rx beam using the initial rx beam direction and beam search procedures shown in FIGS. 4 and 5 (S720).

Then, the master node 100 receives the discovery reference signals DRS(s) transmitted in various directions from the slave node (S730) and may use the beam search procedure shown in FIG. 4 to determine an rx beam direction among the directions of the received reference signals (S740). The master node 100 that has determined the rx beam sends feedback or an access response to the slave node 200 (S750) so that the beam search procedure is completed.

Meanwhile, a reference signal for the reestablishment procedure may be transmitted separately from a reference signal for an initial access. In this case, the beam search procedure as shown in FIG. 4 may be further applied to determination of a tx beam of the discovery reference signal DRS(m) transmitted by the master node.

Additionally, the master node may need to be changed in the course of reestablishing a radio link due to mobility of the transmission node.

Figure 8:
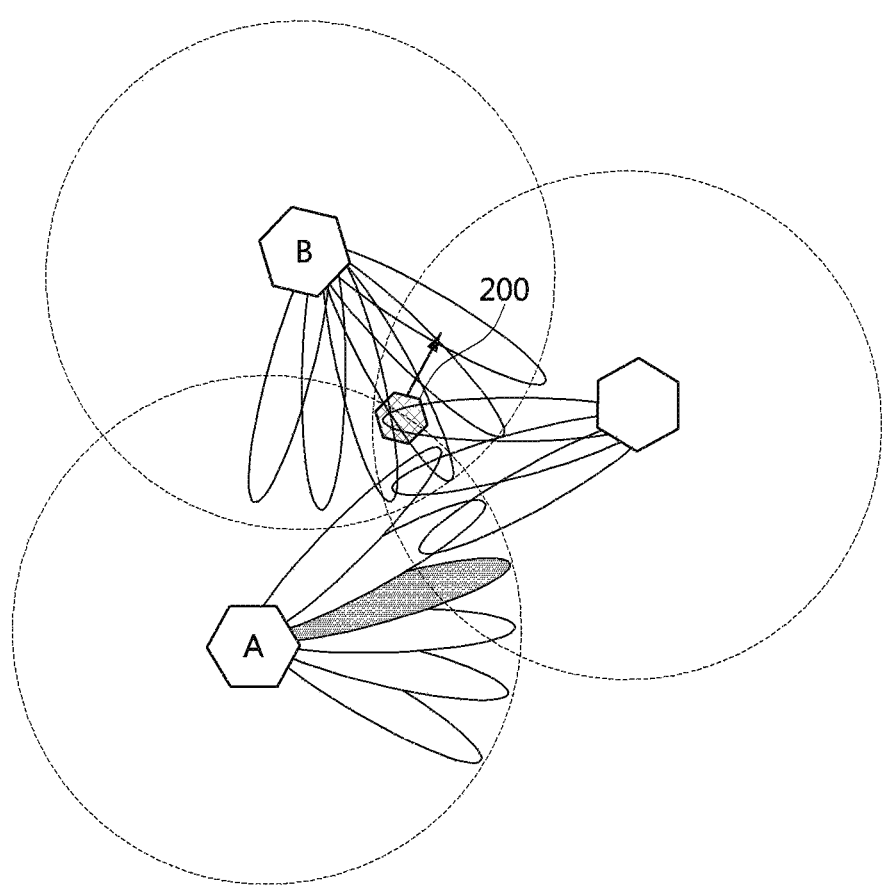
FIG. 8 is a diagram illustrating a case in which a change in master node occurs when a terminal moves.

FIG. 8 is a diagram illustrating a case in which a change in master node occurs when a terminal moves.

Referring to FIG. 8, when a terminal 200 that is a slave node in relation to base station A moves into a service area of base station B, it may be necessary for a procedure to determine a master node among base station A and base station B before a procedure for reestablishing a radio link between two transmission nodes is performed.

Figure 9:
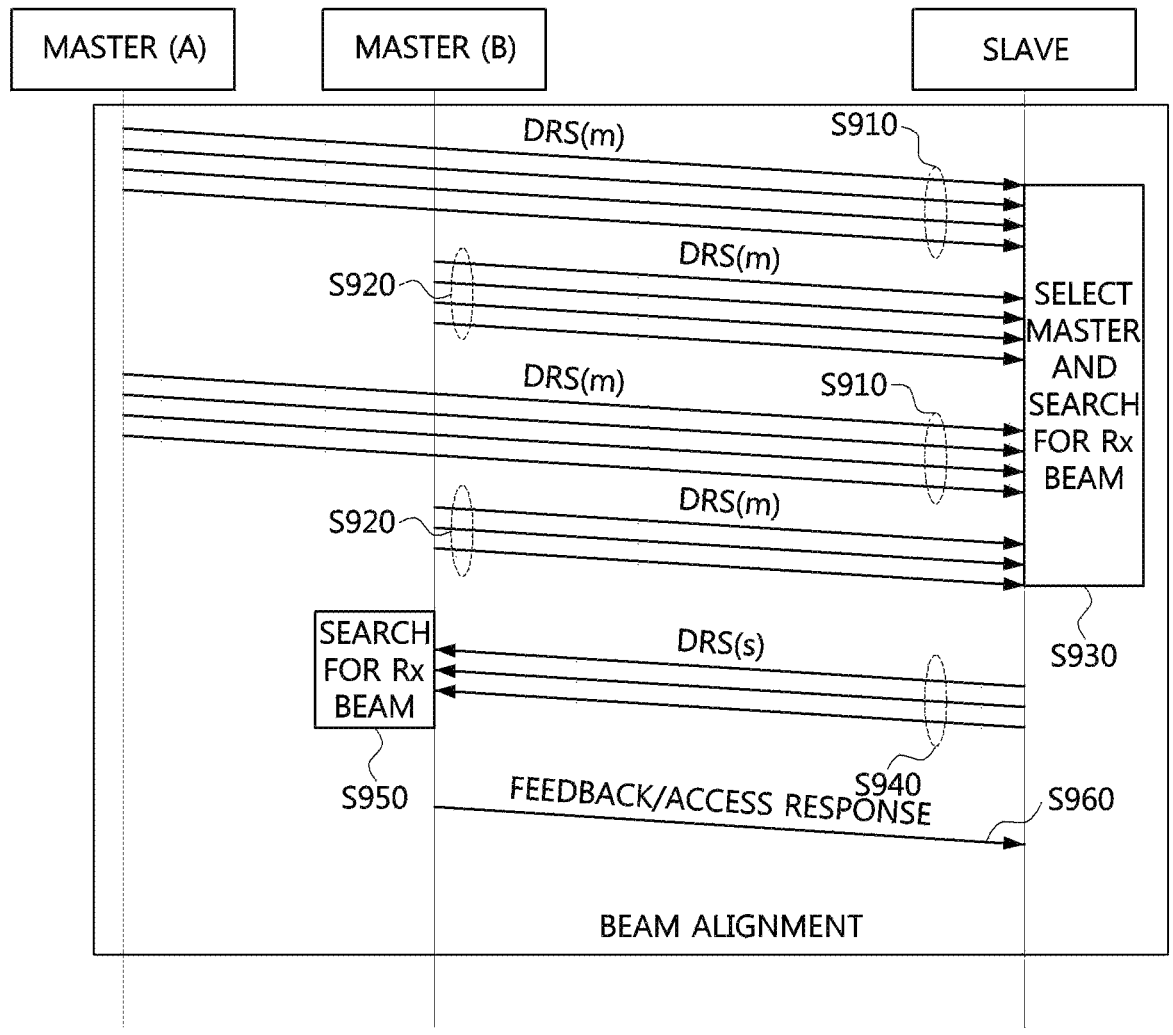
FIG. 9 is an operation flowchart of a method of determining a master node according to one embodiment of the present invention.

FIG. 9 is an operation flowchart of a method of determining a master node according to one embodiment of the present invention.

In FIG. 9, a slave node 200 receives reference signals from master A and master B (S910 and S920), selects a master node according to the received signal, and searches for an rx beam appropriate for a beam transmitted from the selected master node (S930). Then, the slave node transmits a reference signal thereof (S940), and the master node B determines a direction of an rx beam for oneself by performing a beam search (S950).

The master node 100 that has determined its own rx beam sends feedback or an access response to the slave node 200 (S960) so that the beam search procedure is completed.

As described with reference to FIG. 9, the master node determination procedure may be performed through the procedure for receiving the reference signals from a plurality of master nodes, and the master node determination procedure may be performed along with the beam search procedure described with reference to FIG. 4.

Figure 10:
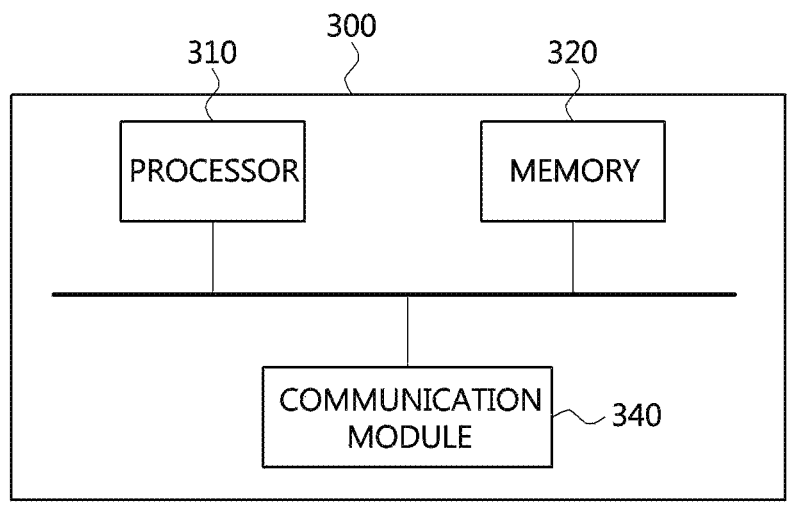
FIG. 10 is a block diagram illustrating a wireless communication device according to one embodiment of the present invention.

FIG. 10 is a block diagram illustrating a wireless communication device according to one embodiment of the present invention.

The wireless communication device 300 according to one embodiment of the present invention may communicate with another device and may act as a master or a slave in relation to the other device. The wireless communication device 300 may include a processor 310 and a memory 320 in which at least one command executed by the processor is stored. The wireless communication device 300 may further include a communication module 330 for communication with another device.

Here, the at least one command may include commands causing the processor to monitor quality of a radio link used for communication with a peer node, determine whether radio link reestablishment is needed when the quality of the radio link is less than or equal to a reference value, determine a beam search parameter using at least one of information on the activation status of the radio link and mobility information of the peer node, perform a beam search required for radio link reestablishment according to the beam search parameter, and reestablish a radio link with the peer node using the found beam.

By using the method according to the embodiments of the present invention as described above, it is possible to reduce a delay in additional procedures which are performed since directivity needs to be considered even in a procedure for establishing a radio link between transmission nodes as beamforming for reducing large path loss in a wireless network utilizing a millimeter-wave band and directional communication through multi-antenna beamforming technologies are used.

The method according to the embodiments of the present invention may also be embodied as computer readable program or codes on a computer readable recording medium. The computer readable recording medium is any data storage device that can store data which can be thereafter read by a computer system. The computer readable recording medium can also be distributed over network coupled computer systems so that the computer readable program or code is stored and executed in a distributed fashion.

In addition, examples of the computer-readable recording medium may include hardware devices specially configured (or designed) for storing and executing program commands, such as read only memories (ROMs), random access memories (RAMs), flash memories, and so on. Examples of a program command may not only include machine language codes, which are created by a compiler, but may also include high-level language codes, which may be executed by a computer by using an interpreter, and so on.

Although some aspects have been described in the context of an apparatus, it is clear that these aspects also represent a description of the corresponding method, where a block or device corresponds to a method step or a feature of a method step. Similarly, aspects described in the context of a method step also represent a description of a corresponding block or item or feature of a corresponding apparatus. Some or all of the method steps may be executed by (or using) a hardware apparatus, such as, for example, a microprocessor, a programmable computer or an electronic circuit. In some embodiments, one or more of the most important method steps may be executed by such an apparatus.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While the example embodiments of the present invention and their advantages have been described in detail, it should be understood that various changes, substitutions and alterations may be made herein without departing from the scope of the invention.

What is claimed is:

1. A method of reestablishing a radio link which is performed by a wireless communication device that communicates with a peer node, the method comprising:
    monitoring quality of a radio link used for communication with the peer node;
    determining whether radio link reestablishment is needed when the quality of the radio link is less than or equal to a reference value;
    determining a beam search parameter using information on the activation status of the radio link and mobility information of the peer node;
    performing a beam search necessary for radio link reestablishment according to the beam search parameter; and
    reestablishing a radio link with the peer node using a found beam.

2. The method of claim 1, wherein the beam search parameter includes at least one of a direction of a beam from which to start a search, a step size of a search, and a search proceeding direction.

3. The method of claim 2, wherein the direction of the beam from which to start a search is an index of a beam from which a search starts among all beams of the wireless communication device.

4. The method of claim 2, wherein the direction of the beam from which to start a search is determined using at least one of the information on the activation status of the radio link, the mobility of the peer node, and a beam dwell time.

5. A method of reestablishing a radio link which is performed by a wireless communication device that communicates with a peer node, the method comprising:
    monitoring quality of a radio link used for communication with the peer node;
    determining whether radio link reestablishment is needed when the quality of the radio link is less than or equal to a reference value;
    determining a beam search parameter using at least one of information on the activation status of the radio link and mobility information of the peer node;
    performing a beam search necessary for radio link reestablishment according to the beam search parameter; and
    reestablishing a radio link with the peer node using a found beam, wherein the information on the activation status of the radio link includes a direction of a last beam in which the radio link was kept in an active state.

6. The method of claim 1, wherein the mobility of the peer node includes a moving velocity and moving direction of the peer node with respect to the wireless communication device.

7. The method of claim 1, wherein the performing of the beam search necessary for radio link reestablishment according to the beam search parameter includes receiving a reference signal transmitted by the peer node that is a master node and determining a receive beam corresponding to the reference signal.

8. The method of claim 1, wherein the performing of the beam search necessary for radio link reestablishment according to the beam search parameter includes receiving reference signals transmitted by a plurality of peer nodes, determining a master node among the plurality of peer nodes according to the reference signals, and determining a receive beam corresponding to a reference signal transmitted by the determined master node.

9. The method of claim 2, wherein the determining of the beam search parameter using at least one of the information on the activation status of the radio link and the mobility information of the peer node includes determining a fixed step size and maintaining the search direction to one direction when the moving direction of the peer node is fixed.

10. The method of claim 2, wherein the determining of the beam search parameter using at least one of the information on the activation status of the radio link and the mobility information of the peer node includes setting the step size in units of sub-groups and performing the beam search by selecting one beam for each sub-group.

11. The method of claim 2, wherein the determining of the beam search parameter using at least one of the information on the activation status of the radio link and the mobility information of the peer node includes, when accuracy of the direction of the beam from which to start a search is high, setting the search proceeding direction by altering the search proceeding direction in every search step.

12. A wireless communication device which reestablishes a radio link used for communication with a peer node, the wireless communication device comprising:
    a processor; and
    a memory in which a plurality of commands executed by the processor is stored, wherein the plurality of commands include;
    a command to monitor quality of the radio link used for communication with the peer node;
    a command to determine whether radio link reestablishment is required when the quality of the radio link is less than or equal to a reference value;
    a command to determine a beam search parameter using information on the activation status of the radio link and mobility information of the peer node;
    a command to perform a beam search necessary for radio link reestablishment according to the beam search parameter; and
    a command to reestablish a radio link with the peer node using the found beam.

13. The wireless communication device of claim 12, wherein the beam search parameter includes at least one of a direction of a beam from which to start a search, a step size of a search, and a search proceeding direction.

14. The wireless communication device of claim 13, wherein the direction of the beam from which to start a search is determined using at least one of the information on the activation status of the radio link, the mobility of the peer node, and a beam dwell time.

15. The wireless communication device of claim 14, wherein the information on the activation status of the radio link includes a direction of a last beam in which the radio link was kept in an active state.

16. The wireless communication device of claim 12, wherein the mobility of the peer node includes a moving velocity and moving direction of the peer node with respect to the wireless communication device.

17. The wireless communication device of claim 12, wherein the command to perform the beam search necessary for radio link reestablishment according to the beam search parameter includes a command to receive a reference signal transmitted from the peer node which is a master node, and a command to determine a receive beam corresponding to the reference signal.

18. The wireless communication device of claim 12, wherein the wireless communication device is a terminal or a base station.

\* \* \* \* \*